(12) United States Patent
Nakatani et al.

(10) Patent No.: US 8,081,445 B2
(45) Date of Patent: Dec. 20, 2011

(54) DRAINAGE STRUCTURE AND INFORMATION PROCESSING UNIT

(75) Inventors: Hitoshi Nakatani, Osaka (JP); Shintaro Tanaka, Osaka (JP); Haruka Kaneko, Kyoto (JP); Yoshiaki Nagamura, Osaka (JP)

(73) Assignee: Panasonic Corporation, Osaka (JP)

( * ) Notice: Subject to any disclaimer, the term of this patent is extended or adjusted under 35 U.S.C. 154(b) by 27 days.

(21) Appl. No.: 12/544,398

(22) Filed: Aug. 20, 2009

(65) Prior Publication Data

US 2010/0046158 A1  Feb. 25, 2010

(30) Foreign Application Priority Data

Aug. 25, 2008 (JP) ................................. 2008-215656

(51) Int. Cl.
*G06F 1/16* (2006.01)
*H01H 9/04* (2006.01)

(52) U.S. Cl. ......... 361/679.55; 361/679.26; 361/679.27; 200/302.1

(58) Field of Classification Search .......... 361/679.01–679.45, 679.55–679.59; 345/156, 157, 168, 169; 455/575.1, 575.3, 455/575.4; 200/302.1
See application file for complete search history.

(56) References Cited

U.S. PATENT DOCUMENTS

| | | | |
|---|---|---|---|
| 5,421,659 A * | 6/1995 | Liang | 400/472 |
| 6,208,504 B1 * | 3/2001 | Cho et al. | 361/679.59 |
| 6,443,644 B1 * | 9/2002 | Takeda et al. | 400/490 |
| 6,610,944 B2 * | 8/2003 | Lee et al. | 200/302.1 |
| 6,628,507 B2 * | 9/2003 | Hsu et al. | 361/679.08 |
| 2003/0057076 A1 | 3/2003 | Lee et al. | |
| 2006/0133024 A1 * | 6/2006 | Kim et al. | 361/683 |
| 2008/0019085 A1 * | 1/2008 | Nakajima | 361/680 |
| 2008/0037205 A1 * | 2/2008 | Arisaka et al. | 361/680 |

FOREIGN PATENT DOCUMENTS

| | | |
|---|---|---|
| JP | 7-234749 A | 9/1995 |
| JP | 2003-122454 A | 4/2003 |
| JP | 2007-249624 A | 9/2007 |

* cited by examiner

*Primary Examiner* — Jayprakash N Gandhi
*Assistant Examiner* — Nidhi Desai
(74) *Attorney, Agent, or Firm* — Hamre, Schumann, Mueller & Larson, P.C.

(57) ABSTRACT

A drainage structure of the present invention includes a drainage groove, a drain, and a groove portion. Thus, even in the case where a user accidentally spills a liquid such as water on an upper face of a first housing, intrusion of the liquid into a disk drive can be prevented, and damage to the disk drive can be prevented. Moreover, the drain is connected to the groove portion. Thus, a liquid that drains from the drain can be collected in the groove portion. Accordingly, the liquid can be prevented from spreading over a wide area, and adhesion of the liquid to various types of electric components disposed in a back face of the first housing can be prevented.

5 Claims, 5 Drawing Sheets

DRAINAGE STRUCTURE AND INFORMATION PROCESSING UNIT

BACKGROUND OF THE INVENTION

1. Field of the Invention

The present invention relates to a drainage structure that is capable of draining a liquid such as water that has intruded into an apparatus to the outside. The present invention also relates to an information processing unit including such a drainage structure.

2. Description of Related Art

In recent years, many notebook PCs are provided with waterproof, drip-proof functionality on the assumption that drinks and the like may be spilled on notebook PCs or raindrops and the like may adhere to notebook PCs during outdoor use. As an example of the waterproof, drip-proof functionality, a drain for draining a liquid that has intruded from an upper face of a personal computer to a bottom face side of the personal computer is provided so as to prevent accumulation of the liquid inside the personal computer.

JP 7-234749A discloses a keyboard in which, as a waterproofing mechanism, a surface for guiding a water droplet to an insertion port leading to a back face of a switch panel through a molded hole is provided on the surface of the switch panel. JP 7-234749A discloses a keyboard in which a draining pipe having a sufficient length to pass through a switch unit and a support panel and surrounding the molded hole is formed on the back face of the switch panel by integral molding during the forming of the switch panel.

JP 2003-122454A discloses a notebook PC having a keyboard assembly that is configured to include a base plate, a plurality of key buttons mounted on the base plate, and a drainage means for draining a liquid that has permeated between the key buttons.

JP 2007-249624A discloses a draining structure of a notebook PC equipped with, in the main body thereof, a disk drive to which a disk-shaped recording medium can be removably attached, the draining structure including a disk cover that covers the disk drive and grooves that are provided in positions corresponding to both sides of the disk cover in a lower housing of the notebook PC. The draining structure can discharge efficiently a liquid, that causes electrical failure, even when the liquid intrudes from the top of the disk drive.

However, in the case where there is no sufficient drainage region between the housing and an installation surface (table top surface), liquid that has drained to the bottom face side through the above-described drain does not flow out from the drainage grooves to the outside due to surface tension, but rather remains at that position. For this reason, there are the following restrictions: for example, it is necessary to secure a wide space in the vicinity of the drain by increasing the height of rubber feet or the like disposed on the back face of the housing in order to provide sufficient clearance between the back face and the installation surface, or it is necessary to dispose the drain in an area where sufficient space can be secured.

Moreover, assuming a notebook PC has a disk drive in the upper face of the housing where a keyboard and the like are disposed, if a user spills a liquid on the upper face, in some cases, the liquid intrudes into the disk drive through a gap between a lid for opening and closing the disk drive and the upper face of the housing. In order to drain liquid that has intruded into the disk drive to the outside, a configuration in which a drainage groove is formed inside the disk drive along an edge thereof can be conceived. However, in the case where a drainage groove is provided, it is necessary to let the liquid accumulated in the drainage groove flow to the outside of the housing, which makes it necessary to form the drainage groove so as to extend to a front face of the housing and to form the lid into a shape that covers up to the front face of the housing.

SUMMARY OF THE INVENTION

It is an object of the present invention to realize a drainage structure that is capable of preventing a liquid discharged to the back face side of the main body of an apparatus from collecting between the back face of the main body of the apparatus and the installation surface and that enables the lid to be formed into an arbitrary shape, as well as an information processing unit including the drainage structure.

A drainage structure of the present invention is a drainage structure including a housing that includes a first face and a second face opposite the first face; and a drain that is formed so as to pass through the housing from the first face to the second face, wherein a groove portion connected to the drain is formed in the second face.

An information processing unit of the present invention is an information processing unit including a housing that includes a first face and a second face opposite the first face and houses an information processing means and a disk drive that exchanges an information signal with the information processing means and that has an opening in the first face through which a disk-shaped information medium is inserted and removed; and the above-described drainage structure provided in the housing.

According to the present invention, the drain can be installed with no restrictions on the securing of sufficient space or the installation location, and efficient drainage can be achieved. Moreover, the lid can have an arbitrary shape.

DETAILED DESCRIPTION OF THE INVENTION

A drainage structure of the present invention is a drainage structure including a housing that includes a first face and a second face opposite the first face; and a drain that is formed so as to pass through the housing from the first face to the second face, wherein a groove portion connected to the drain is formed in the second face.

An information processing unit of the present invention is an information processing unit including a housing that includes a first face and a second face opposite the first face and houses an information processing means and a disk drive that exchanges an information signal with the information processing means and that has an opening in the first face through which a disk-shaped information medium is inserted and removed; and the above-described drainage structure provided in the housing.

The drainage structure or the information processing unit of the present invention has the above-described configuration as a basic configuration, and embodiments as described below are possible.

In the drainage structure or the information processing unit of the present invention, it is possible that at least a part of the groove portion opens into a third face of the housing that is contiguous to the first face and the second face. With such a configuration, a liquid collecting in the groove portion can be drained quickly to the outside from a gap between the housing and the installation surface.

In the drainage structure or the information processing unit of the present invention, it is possible that the drain is formed in the inside of an edge of the first face and the second face. With such a configuration, the necessity to provide the drain so as to extend to an edge of the housing is eliminated.

Embodiment

Figure 1:
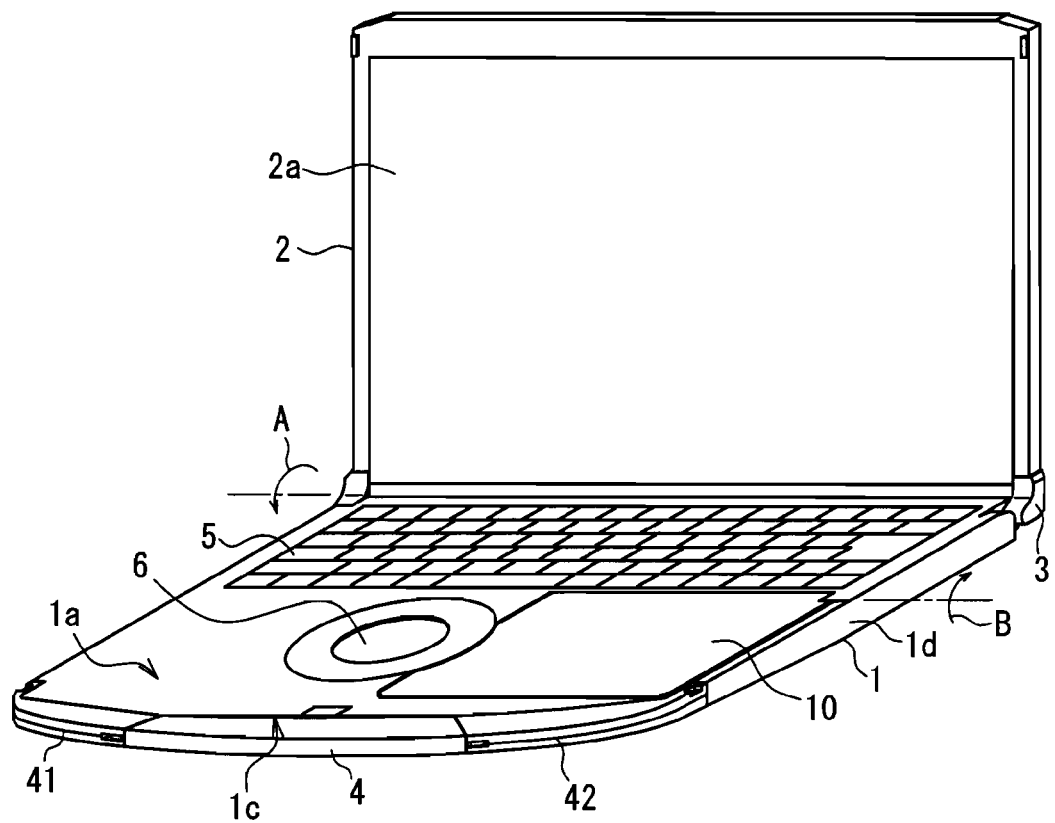
FIG. 1 is a perspective view showing an external appearance of an information processing unit according to an embodiment of the present invention.
Figure 2:
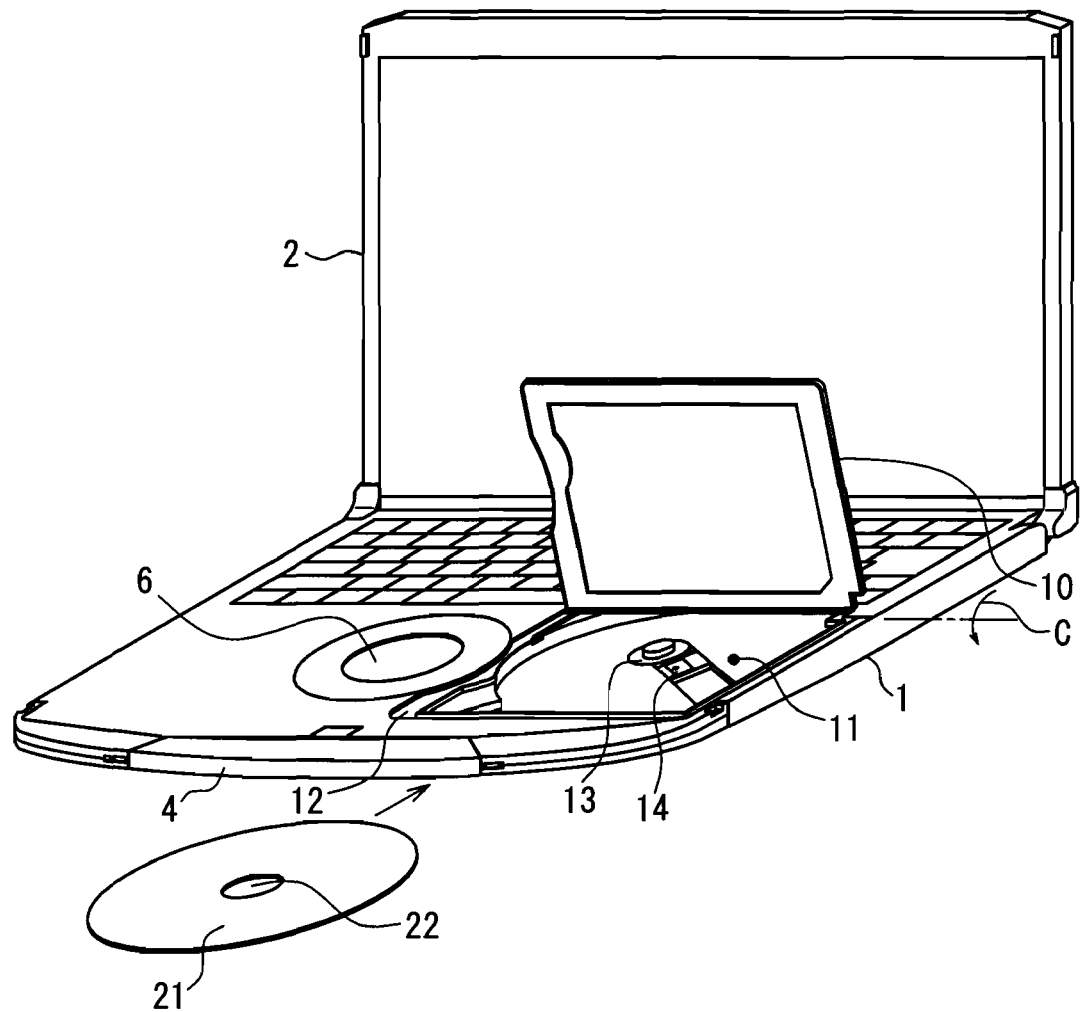
FIG. 2 is a perspective view showing an external appearance of the information processing unit according to the present embodiment.

FIG. 1 is a perspective view showing the external appearance of an information processing unit according to an embodiment of the present invention. FIG. 1 shows a first state of a notebook personal computer (notebook PC) serving as an example of the information processing unit. FIG. 2 is a perspective view showing a state of the notebook PC according to the present embodiment in which a lid 10 (described later) is open. It should be noted that although the notebook PC is described as an example of the information processing unit in the present embodiment, the information processing unit can be any information processing unit, for example, a mobile phone terminal, a terminal for inventory control, or a medical device, as long as the information processing unit can be provided with at least drainage functionality.

As shown in FIG. 1, the notebook PC includes a first housing 1 and a second housing 2. The first housing 1 houses a circuit board on which various types of electric elements are mounted, a hard disk drive, and the like. The second housing 2 includes a liquid crystal display 2a. The first housing 1 and the second housing 2 are supported by a hinge portion 3 in a mutually rotatable manner. The notebook PC can be brought into a second state in which the liquid crystal display 2a and a keyboard 5 closely face each other by rotating the second housing 2 from a position (the first state) shown in FIG. 1 in a direction indicated by arrow A.

Moreover, when a face of the first housing 1 that faces the second housing 2 in the second state is designated as the "upper side", the keyboard 5 and a pointing device 6 are provided in an upper face 1a of the first housing 1. Various types of characters can be input through the keyboard 5. A cursor displayed on the liquid crystal display 2a can be moved to a desired position with the pointing device 6.

The lid 10 is disposed on the upper face 1a of the first housing 1. The lid 10 is supported on the first housing 1 so as to be rotatable in a direction indicated by arrow B (see FIG. 1) or a direction indicated by arrow C (see FIG. 2). A disk drive 11 in the form of a depression disposed in the first housing 1 as shown in FIG. 2 can be accessed with the lid 10. A drainage groove 12, a turntable 13, an optical pickup 14, and the like are provided inside the disk drive 11. The turntable 13 can fit in a circular hole portion 22 formed in the center of a disk-shaped medium 21, thereby retaining the disk-shaped medium 21. The optical pickup 14 can irradiate a recording surface of the disk-shaped medium 21 mounted on the turntable 13 with a laser beam, thereby recording information on the recording surface. The optical pickup 14 can irradiate the recording surface of the disk-shaped medium 21 with a laser beam and receive the laser beam reflected from the recording surface with a light receiving element disposed on the optical pickup 14, thereby reading out information recorded on the disk-shaped medium 21.

For example, in the case where a user accidentally spills a liquid such as water on the upper face 1a of the first housing 1, the liquid may intrude into the disk drive 11. The drainage groove 12 is provided for the purpose of guiding such a liquid to a back face side of the first housing 1.

Hereinafter, a draining structure will be described.

Figure 3:
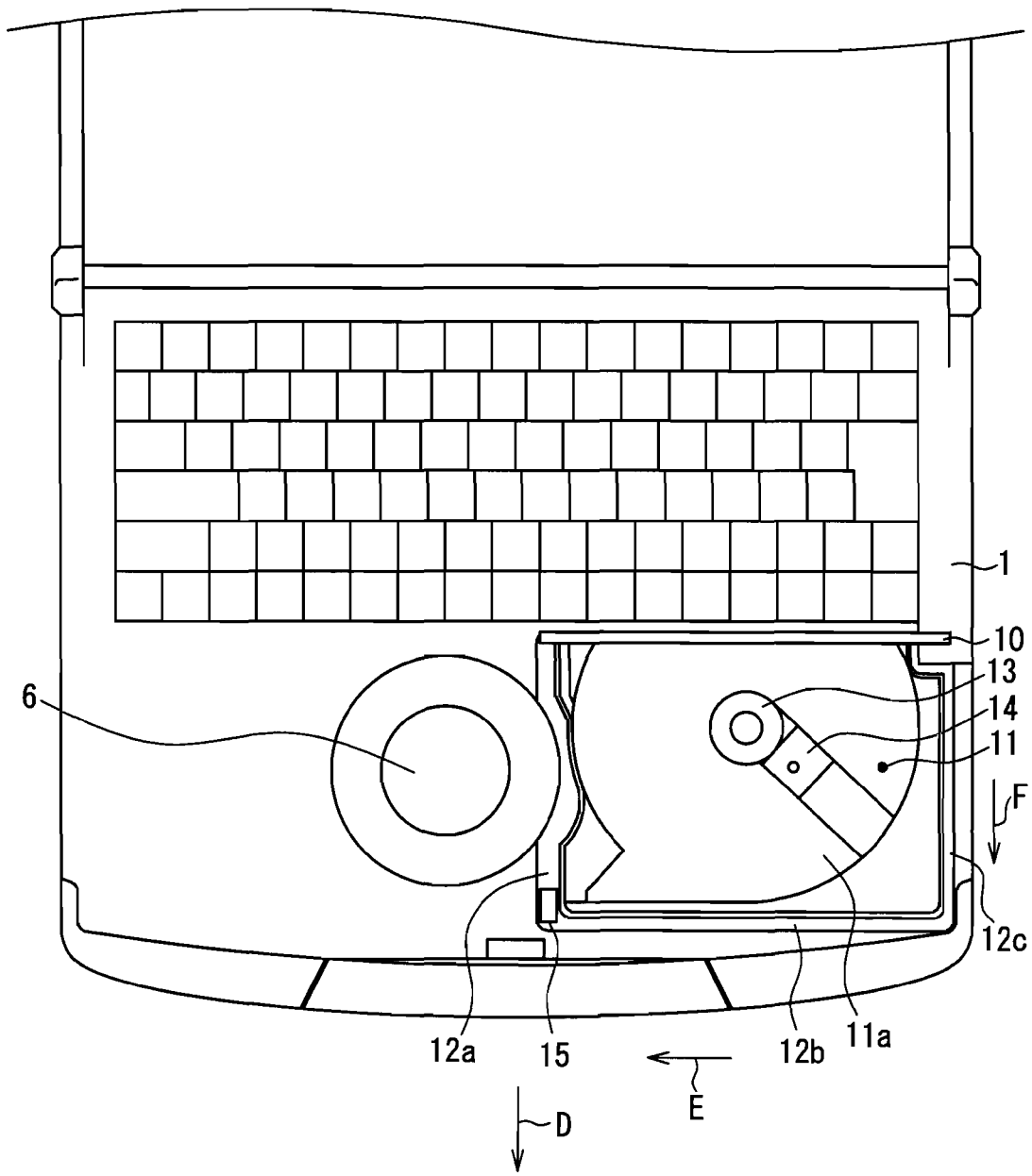
FIG. 3 is a plan view showing the configuration of a first housing on an upper face side.

FIG. 3 is a plan view of the first housing 1. It should be noted that in order to clearly illustrate the configuration inside the disk drive 11, some details of the lid 10 are omitted from FIG. 3. As shown in FIG. 3, the drainage groove 12 includes a first drainage groove section 12a, a second drainage groove section 12b, and a third drainage groove section 12c. The first drainage groove section 12a is formed in the vicinity of the pointing device 6 so as to extend in a direction approximately parallel to a side face 1d (see FIG. 1) of the first housing 1. The second drainage groove section 12b is formed in a position in the disk drive 11 closest to a side face 1c (see FIG. 1) so as to extend in a direction approximately parallel to the side face 1c. The third drainage groove section 12c is formed in a position in the disk drive 11 closest to the side face 1d (see FIG. 1) so as to extend in a direction approximately parallel to the side face 1d. Flow spaces of the first drainage groove section 12a and the second drainage groove section 12b are connected to each other. The flow space of the second drainage groove section 12b and a flow space of the third drainage groove section 12c are connected to each other. The drainage groove 12 is formed in the periphery of a depressed disk housing portion 11a inside the disk drive 11 so as to have an approximately U-shaped cross-sectional shape whose open upper portion faces an inner face of the lid 10 when the lid 10 is closed as shown in FIG. 1. The first drainage groove section 12a and the third drainage groove section 12c are sloped so that a liquid flows from an end thereof on the keyboard 5 side toward an end on the side face 1c side as indicated by arrows D and F. The second drainage groove section 12b is sloped so that a liquid flows from the side face 1d side toward a side face 1b side as indicated by arrow E. Therefore, a liquid that has entered the third drainage groove section 12c flows in the direction indicated by arrow F and then in the direction indicated by arrow E.

A drain 15 is formed in a connected portion between the first drainage groove section 12a and the second drainage groove section 12b. The drain 15 is open in the connected portion between the first drainage groove section 12a and the second drainage groove section 12b and passes through the first housing 1 to reach a back face 1e (described later) of the first housing 1. Consequently, since the drainage groove 12 is formed sloped so that a liquid flows in the directions indicated by arrows D, E, and F as described above, a liquid that has intruded into the drainage groove 12 is guided to the drain 15 and, furthermore, drained to the back face 1e side of the first housing 1 through the drain 15.

Figure 4:
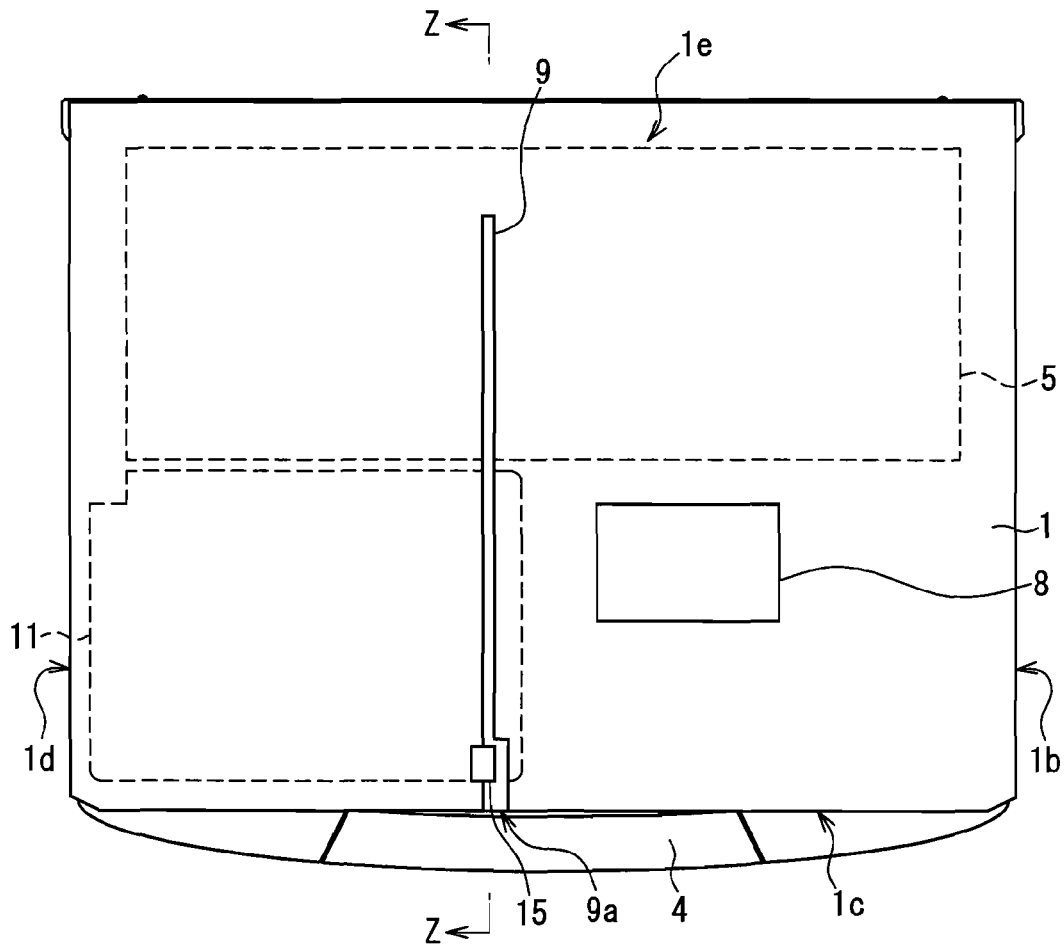
FIG. 4 is a plan view showing the configuration of the first housing on a back face side.

FIG. 4 is a plan view of the back face 1e side of the first housing 1. As shown in FIG. 4, a groove portion 9 and the drain 15 are formed in the back face 1e of the first housing 1. Moreover, a memory slot 8 including a connector to which a memory module can be removably attached is provided in the back face 1e of the first housing 1. The memory slot 8 is covered with a cover.

The groove portion 9 is formed in the back face 1e of the first housing 1 so as to extend in a direction approximately parallel to the side faces 1*b* and 1*d*. An end of the groove portion 9 on the side face 1*c* side reaches the side face 1*c* and opens (an opening 9*a*) into the side face 1*c*. The groove portion 9 can increase the strength of the back face 1*e* of the first housing 1 in a bending direction. The groove portion 9 is spatially connected to the drain 15.

Figure 5:
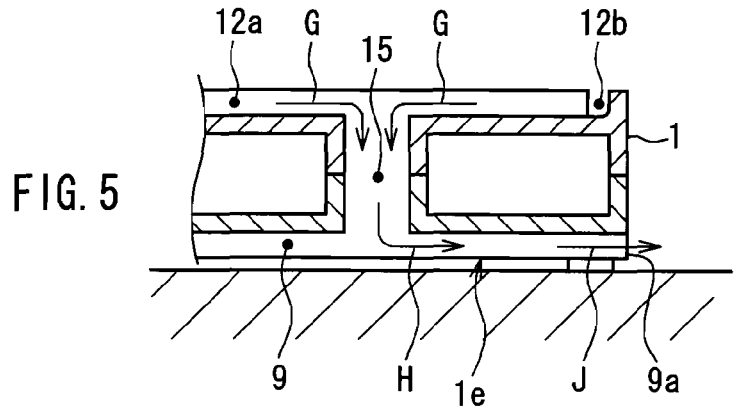
FIG. 5 is a cross-sectional view of a portion Z-Z in FIG. 4.

It should be noted that as shown in a cross-sectional view in FIG. 5, the drain 15 is formed so as to pass through the first housing 1 from the upper face 1*a* side to the back face 1*e* side. FIG. 5 is a cross-sectional view of a relevant part of a Z-Z portion in FIG. 4.

Next, a draining operation will be described.

In FIG. 3, in the case where the user accidentally spills a liquid such as water on or near the lid 10, the liquid flows over the lid 10 to intrude into a minute gap between the lid 10 and the first housing 1. Moreover, even in the case where an amount of liquid that exceeds the drainage capacity of a drain 7 disposed on the underside of the keyboard 5 is spilled on the keyboard 5, the liquid may intrude into the gap between the lid 10 and the first housing 1.

A liquid that has intruded into the gap flows through the drainage grooves 12*a* to 12*c*. Since the drainage grooves 12*a* to 12*c* are formed sloped down toward the drain 15, the liquid that has flowed into the first drainage groove section 12*a* flows in the direction indicated by arrow D, the liquid that has flowed into the second drainage groove section 12*b* flows in the direction indicated by arrow E, and the liquid that has flowed into the third drainage groove section 12*c* flows in the direction indicated by arrow F. That is to say, any liquid flowing into the drainage groove 12 flows toward the drain 15 as indicated by arrows G in FIG. 5.

The liquid that has reached the drain 15 flows through the drain 15 to the back face 1*e* side of the first housing 1 and collects between the back face 1*e* and an installation surface. At this time, as shown in FIG. 4, since the drain 15 on the back face 1*e* side and the groove portion 9 are spatially connected to each other, the liquid that has flowed to the back face 1*e* side collects between the groove portion 9 and the installation surface instead of spreading over a wide area between the back face 1*e* and the installation surface. Therefore, the liquid is less likely to flow toward the memory slot 8 disposed in the back face 1*e*, and the possibility that the liquid will intrude into the memory slot 8 due to capillary action is slight.

Moreover, the groove portion 9 is in communication with the outside through the opening 9*a* in the side face 1*c*, and a liquid that has flowed out into the groove portion 9 thus can be drained quickly to the outside from between the first housing 1 and the installation surface. Moreover, even in the case where a larger amount of liquid than can be collected between the groove portion 9 and the installation surface is drained from the drain 15, the liquid can be quickly drained to the outside through the opening 9*a* in the side face 1*c* as indicated by arrows H and J in FIG. 5.

According to the present embodiment, since the drainage groove 12, the drain 15, and the groove portion 9 are provided, even in the case where the user accidentally spills a liquid such as water on the upper face 1*a* of the first housing 1, intrusion of the liquid into the disk drive 11 can be avoided, and damage to the disk drive 11 can be avoided.

In the notebook PC of the present embodiment, as shown in FIGS. 1 to 4, a handle 4 that the user grips when, for example, carrying the notebook PC is provided on the side face 1*c* of the first housing 1 that is opposite from the hinge portion 3. Examples of a conventional draining structure include a drainage groove formed in the side face 1*c* of the first housing 1, but it is difficult to provide a drainage groove in the side face 1*c* in the case of a notebook PC having the handle 4 on the side face 1*c* as in the present embodiment. To address this issue, in the present embodiment, the drain 15 is provided inside the disk drive 11, and thus a liquid that is caused to enter the disk drive 11 by accident by the user or the like can be drained.

Figure 6:
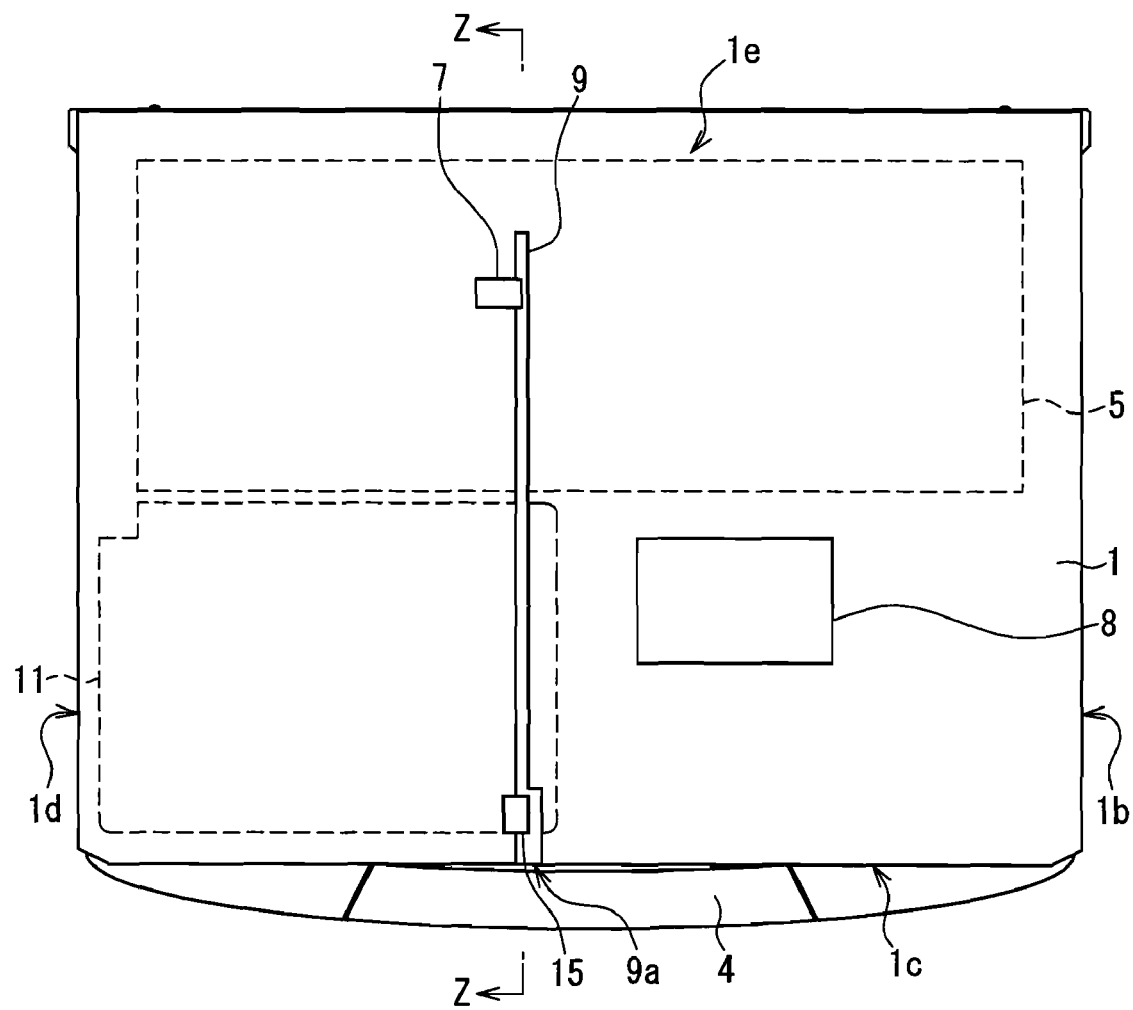
FIG. 6 is a plan view showing another configuration example of an information processing unit according to an embodiment of the present invention.

FIG. 6 is a plan view of the back face 1*e* side of a notebook PC according to another embodiment of the present invention. It should be noted that in FIG. 6, components having the same function as those in the previous embodiment are denoted by the same reference numerals. The present embodiment differs from the previous embodiment only in that the drain 7 is spatially connected to the groove portion 9.

The drain 7 is formed on a back face side of the keyboard 5 disposed in the upper face 1*a* of the first housing 1. The drain 7 is formed so as to pass through the first housing 1 from the upper face 1*a* to the back face 1*e*. In the case where the user accidentally spills a liquid such as water on the keyboard 5, the drain 7 can guide the liquid to the back face 1*e* side of the first housing 1.

In the present embodiment, even in the case where a liquid such as water is spilled on the keyboard 5 by accident, the spilled liquid can be drained quickly through the opening 9*a* opened in the side face 1*c*, as is the case with the drain 15.

Moreover, since the drain 15 is connected to the groove portion 9, a liquid drained from the drain 15 can collect in the groove portion 9. Accordingly, the liquid can be prevented from spreading over a wide area in a space between the first housing 1 and the installation surface, and the liquid can be prevented from adhering to various types of electric components disposed in the back face 1*e* of the first housing 1.

Moreover, since a configuration in which a liquid that flows down into the drainage groove 12 is drained to the back face 1*e* side of the first housing 1 through the drain 15 formed in the drainage groove 12 is employed, it is not necessary to form the drainage groove 12 so as to extend to a position where the drainage groove 12 reaches the side face 1*c*, and it also is not necessary to form the lid 10 so as to have a shape that reaches the side face 1*c*. Therefore, the lid 10 can be formed into an arbitrary shape. For example, as shown in FIG. 1, in the case of a notebook PC having a handle 4 that can be gripped by the user with a hand and supporting members 41 and 42 that support the handle 4, it is difficult to provide a lid 10 that reaches the side face 1*c* like a conventional lid. However, since the necessity for the lid 10 to reach the side face 1*c* is eliminated by providing a drainage groove 12 as in the present embodiment, the lid 10 can be formed into an arbitrary shape.

Moreover, since a configuration in which a liquid drained to the back face 1*e* side collects between the groove portion 9 and the installation surface is employed, the liquid can be prevented from widely spreading between the back face 1*e* and the installation surface, and intrusion of the liquid into the memory slot 8 disposed in the back face 1*e* can be prevented. Therefore, the liquid is prevented from adhering to electric components such as a memory module and a connector disposed inside the memory slot 8, and a short-circuit or the like of the electric components can be avoided.

Moreover, since a configuration in which an end of the groove portion 9 opens into the side face 1*c* is employed, a liquid collecting between the groove portion 9 and the installation surface can be drained to the outside through the opening in the side face 1*c*. Thus, any liquid within the groove portion 9 can be drained quickly to the outside, and the collection of a large amount of liquid between the first housing 1 and the installation surface can be avoided.

Moreover, by using a groove portion for reinforcement as well as for drainage, the necessity to form a separate groove portion for drainage is eliminated, which results in improved ease of manufacture. Moreover, by using a groove portion for reinforcement as well as for drainage, the necessity to significantly change a die and the like is eliminated, which results in low manufacturing cost.

It should be noted that although a configuration of the lid 10 that covers the disk drive 11 is described in the above-described embodiments, the present invention is not limited to a disk drive and can be applied to any structure in the form of a depression that can be covered with a lid. For example, the present invention also can be applied to a lid structure for opening and closing a depression inside of which various types of input/output terminals are provided. That is to say, the disk drive 11 in the above-described embodiments is one example of a depression of the present invention.

Moreover, although the groove portion 9 is formed so as to extend to an end of the first housing 1 in the above-described embodiments, it is not always necessary for the groove portion 9 to extend to the end of the first housing 1. For example, in the case where a groove portion having a sufficient length (volume) can be formed in the back face 1e of the first housing 1, the position of a liquid can be stabilized between the back face 1e and the installation surface. Thus, the liquid can be prevented from adhering to an electric component such as a memory slot.

Moreover, although the groove portion 9 is formed with one end in a longitudinal direction reaching the side face 1c of the first housing 1 in the above-described embodiments, the other end of the groove portion 9 also may reach a side face of the first housing 1. With such a configuration, drainage can be performed more quickly.

Moreover, the upper face 1a of the above-described embodiments is an example of a first face of the present invention. The back face 1e of the above-described embodiments is an example of a second face of the present invention. The side face 1c of the above-described embodiments is an example of a third face of the present invention. The first housing 1 of the above-described embodiments is an example of a housing of the present invention. The groove portion 9 of the above-described embodiments is an example of a groove portion of the present invention. The drains 7 and 15 of the above-described embodiments are examples of a drain of the present invention.

The drainage structure of the present invention is useful for a device having waterproof functionality. Examples of applications of the present invention include information processing units such as notebook PCs having waterproof functionality.

With respect to the above-described embodiments, the following notes are disclosed.

(Note 1)

A drainage structure including:

a housing that includes a first face and a second face opposite the first face; and a drain that is formed so as to pass through the housing from the first face to the second face, wherein a groove portion connected to the drain is formed in the second face.

(Note 2)

The drainage structure according to Additional Remark 1, wherein at least a part of the groove portion opens into a third face of the housing that is contiguous to the first face and the second face.

(Note 3)

The drainage structure according to Additional Remark 1, wherein the drain is formed in an inside of an edge of the first face and the second face.

(Note 4)

An information processing unit including:

a housing that includes a first face and a second face opposite the first face;

an information processing means; and a disk drive that is internally contained in the housing, exchanges an information signal with the information processing means, and has an opening in the first face through which a disk-shaped information medium is inserted and removed, wherein the information processing unit further includes:

a drain that is formed so as to pass through the housing from the first face to the second face; and a groove portion that is formed in the second face and connected to the drain.

(Note 5)

The information processing unit according to Additional Remark 4, wherein at least a part of the groove portion opens into a third face of the housing that is contiguous to the first face and the second face.

(Note 6)

The information processing unit according to Additional Remark 4, wherein the drain is formed in an inside of an edge of the first face and the second face.

(Note 7)

The information processing unit according to Additional Remark 4 including:

a lid that is rotatable on a rotation shaft so as to open and close the opening; and a grip member, wherein the grip member is disposed on a side face of the housing that is on an outer boundary line side of the opening that is opposite from the rotation shaft when the opening is closed with the lid and with which a side of the lid opposite from the rotation shaft engages.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A drainage structure comprising: a housing that comprises a first face and a second face opposite the first face; and a drain that is formed so as to pass through the housing from the first face to the second face and having a first opening in the first face and a second opening in the second face, wherein a groove portion connected to the second opening of the drain and having a groove bottom is formed in the second face with a longitudinal direction of the groove portion along a planar direction of the second face; wherein at least a part of the groove portion opens into a third face of the housing that is contiguous to the first face and the second face.

2. The drainage structure according to claim 1, wherein the drain is formed in an inside of an edge of the first face and the second face.

3. An information processing unit comprising: a housing that comprises a first face and a second face opposite the first face; an information processing means; and a disk drive that is internally contained in the housing, exchanges an information signal with the information processing means, and has an opening in the first face through which a disk-shaped information medium is inserted and removed, wherein the information processing unit further comprises: a drain that is formed so as to pass through the housing from the first face to the second face and having a first opening in the first face and a second opening in the second face; and a groove portion that has a groove bottom and is formed in the second face with a longitudinal direction of the groove portion along a planar direction of the second face, and connected to the second opening of the drain; wherein at least a part of the groove portion opens into a third face of the housing that is contiguous to the first face and the second face.

4. The information processing unit according to claim 3, wherein the drain is formed in an inside of an edge of the first face and the second face.

5. The information processing unit according to claim 3 comprising:
   a lid that is rotatable on a rotation shaft so as to open and close the opening; and
   a grip member,
   wherein the grip member is disposed on a side face of the housing that is on an outer boundary line side of the opening that is opposite from the rotation shaft when the opening is closed with the lid and with which a side of the lid opposite from the rotation shaft engages.

* * * * *